Figure 1:
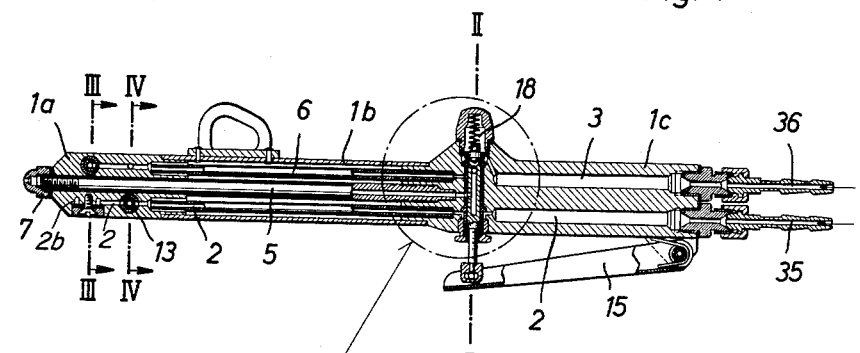

Dec. 4, 1962  W. FLICK ETAL  3,066,873
APPARATUS FOR THE COMPRESSED AIR INJECTION OF SEPARATING
AGENTS AND/OR LUBRICANTS INTO PRESSURE CASTING MOLDS
Filed Feb. 16, 1961  2 Sheets-Sheet 1

INVENTORS
WILLY FLICK
RUDOLF HOHLWEG
ERNST UMHOEFER
BY Robert H Jacob
AGT.

United States Patent Office 3,066,873
Patented Dec. 4, 1962

3,066,873
APPARATUS FOR THE COMPRESSED AIR INJECTION OF SEPARATING AGENTS AND/OR LUBRICANTS INTO PRESSURE CASTING MOLDS
Willy Flick, Rudolf Hohlweg, and Ernst Umhofer, Munich, Germany, assignors to Kluber Lubrication Ges.m.b.H., Munich, Germany
Filed Feb. 16, 1961, Ser. No. 89,883
Claims priority, application Germany Feb. 18, 1960
11 Claims. (Cl. 239—413)

The invention relates to an apparatus for the compressed air injection of separating agents and/or lubricants into pressure casting moulds, and comprises an elongated bar-shaped casing having axial ducts for compressed air and lubricant, which ducts are connectable at the rear of the casing to the supply ducts and are formed at the front of the casing with lateral exit apertures extending transversely of the longitudinal axis of the casing.

The elongated bar-shaped casing with its front lateral exit apertures is very advantageous so far as the rapid and reliable introduction of separating agents or lubricants into pressure casting moulds is concerned, since such a bar-shaped casing of any desired length can readily be introduced into pressure casting moulds having a reduced opening travel, and very reduced rotation of the device around its longitudinal axis—and such rotation is not impeded by the mould parts—ensures a completely reliable application of separating agent to the inside walls of even the most complicated moulds. Another advantage of the apparatus according to the invention is that the two parts of a mould can be sprayed simultaneously, thus saving even more time. Advantageously, the casing is of substantially rectangular cross-section, its height being greater than its width. Conveniently, the lateral duct exit apertures are formed as suction nozzles which co-operate with the compressed air to suck the spraying agent out of a supply vessel. In this manner the supply pipe for the spraying agent can be connected to a portable vessel.

The ducts for compressed air and spraying agent are controlled by control members disposed inside the bar-shaped casing while the supply of compressed air is suitably controlled by a manually operated valve, and the supply of spraying agent is controlled by a valve the operation of which depends upon the supply of compressed air. The last-mentioned valve is suitably disposed at the front of the casing so that most of the lubricant duct within the casing is usually kept full of lubricant. The operating valve may best be so designed and disposed as to provide a stepwise control of compressed air supply and of the exit of compressed air and spraying agent.

For instance, the operating valve can be formed as a hollow piston, the interior of which can communcate through transverse ducts with a compressed air supply duct and can be selectively connected to one of two ducts extending to the exit apertures at the front of the casing. One of these ducts can extend directly to a nozzle through which only compressed air issues from the front end of the casing, while the other compressed air duct branches at the front of the casing into lateral exit nozzles and also comprises a branched duct extending to the valve controlling the supply of spraying agent.

Figure 2:
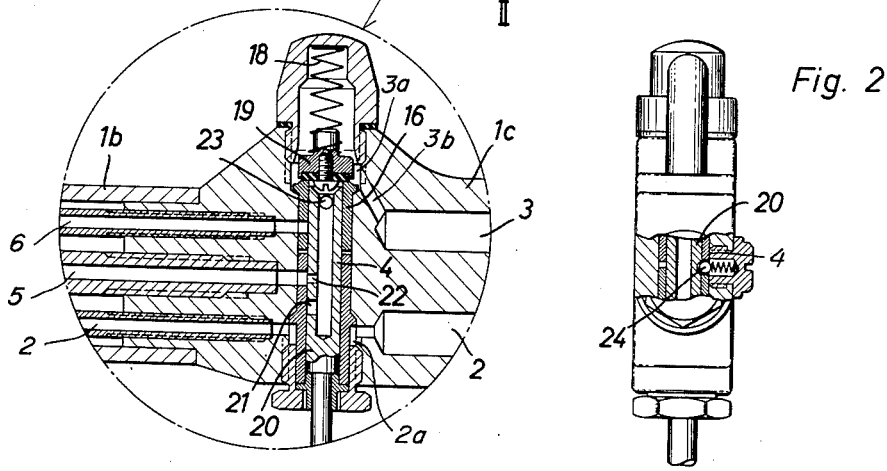
Figure 3:
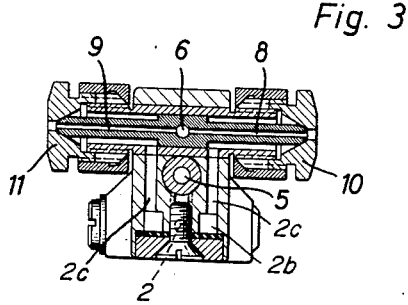
Figure 4:
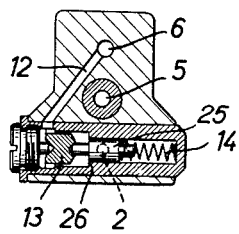
Figure 5:
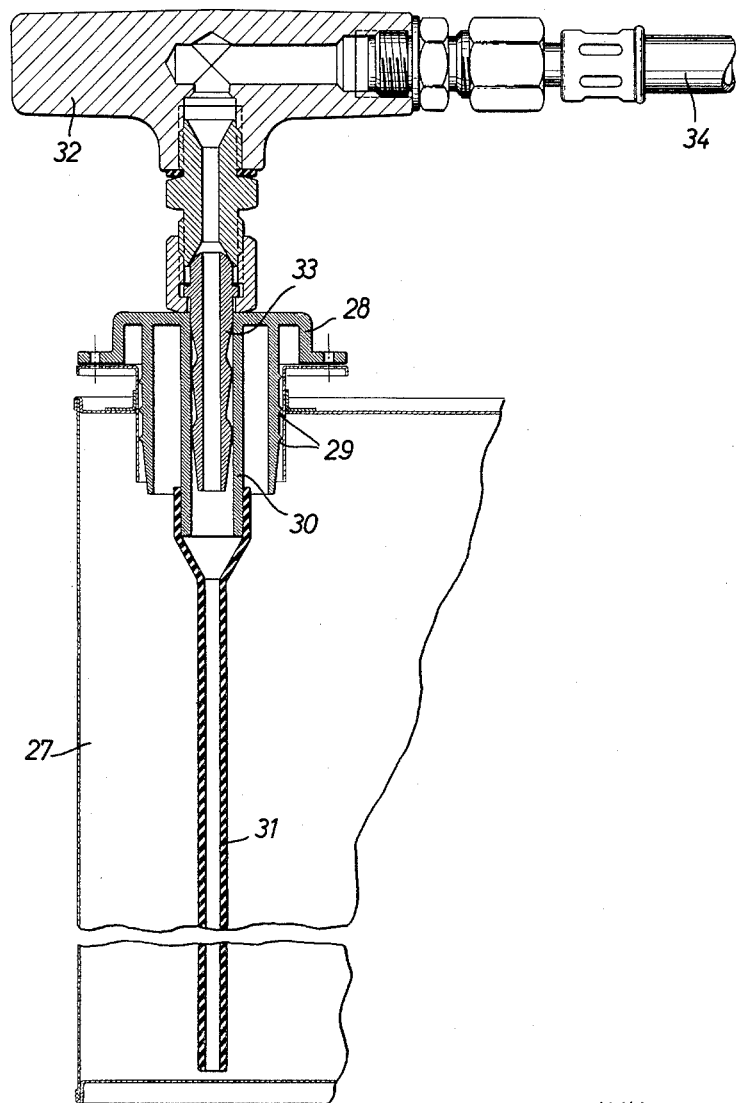

For a better understanding of the invention and to show how the same may be carried into effect, reference may now be made to the accompanying drawings wherein:

FIG. 1 illustrates an apparatus according to the invention in longitudinal section;
FIG. 2 is a front elevation and partial cross-section taken along the line II—II of FIG. 1;
FIG. 3 is a section taken along the line III—III of FIG. 1;
FIG. 4 is a section taken along the line IV—IV of FIG. 1, and
FIG. 5 illustrates a portable vessel, its closure plug and connecting pipe.

As will be apparent more particularly from FIGS. 1 and 2, the apparatus according to the invention takes the form of an elongated bar-shaped casing 1 which can be of any length and which is in cross-section substantially rectangular, its height being greater than its width, as can be seen in FIG. 2. A duct 2 for the spraying agent and a duct 3 for compressed air are disposed inside the casing 1 along the longitudinal axis thereof; the duct 2 extends by way of an annular channel 2a around valve member 16 from the rear end to the forward end of the casing 1, while the duct 3 branches at a control member 4 into two compressed air ducts 5, 6 extending to the front of the casing 1. The duct 5 terminates at the front end face of the casing 1 in a compressed air nozzle 7 through which only compressed air issues, and the duct 6 branches into two crossducts 8, 9 which terminate in spraying nozzles 10, 11 opening laterally of the longitudinal axis of the casing. Another duct 12 branches off the duct 6 and extends to a stop valve 13 which, when operated by compressed air, overcomes the bias of a spring 14 and allows lubricant to flow from the front end of the duct 2 to the nozzles 10, 11. The member 4 is controlled by an operating lever or trigger 15 and takes the form of a piston valve associated with a casing 16, the top open end of which is closed off from the duct 3 by a valve 19 biased by a spring 18. When the trigger 15 is operated, a hollow piston 20 moves inside the casing 16 and can be selectively connected, through the agency of transverse ducts 21, 22, to the compressed air ducts 5, 6. The primary object of the valve 19 is to seal the end of the piston 4 with respect to its housing 16 because it is difficult to prevent a slide piston from leaking for any length of time.

When the trigger 15 is operated against the force of the spring, the piston 20 lifts the valve 19 so that compressed air can flow by way of hose 3b and annular space 3a through a bore 23 disposed about 5 mm. below the top edge of the piston 20 and reach the interior thereof. If the lever 15 is operated only so far that the bottom bore 21 in the piston 20 registers with the main compressed air duct 5, a ball catch 24 which is shown in partial cross-section in FIG. 2 and which is disposed laterally of the piston 20 engages therewith. The catch is so adjusted that the operator can feel when the ball engages in the piston 20 but that when the trigger 15 is released, the piston 20 is returned to its initial position by the spring 18. When the bore 21 in the piston 20 registers with the main compressed air duct 5, compressed air only issues through the front nozzle and can be used to clean away the residues of the previous casting from the mould.

When the trigger 15 is pushed in completely, the top bore 22 in the piston 20 registers with the top compressed air duct 6. Compressed air flows therethrough and through the crossducts 8, 9 to the nozzles 10, 11 and then through the branch duct 12 to the valve 13. The valve member 13 is moved by the compressed air and in turn moves piston 25 against the spring 14 until the ends of duct 2 at opposite sides of piston 25 are open and permit the spraying agent to flow from the duct 2 to the nozzles 10, 11. Spraying agent is drawn by suction through the duct 2 by the compressed air issuing from the nozzles 10, 11 and is sprayed in finely divided form on to the mould walls. As seen in FIGS. 1 and 3 the path of the spraying agent from the duct 2 is by way of an annular channel 2b and a cylindrical channel 2c.

Since the nozzles 10, 11 act as suction nozzles, the spraying agent is sucked into the tube 2 even when the supply vessel is on the ground, but the valve 13 prevents any spraying agent from running out of the apparatus when it is not being used and when the supply vessel is in a higher position than the spraying apparatus. The valve 13 also prevents spraying agent from returning to the supply vessel from the apparatus; consequently, the duct 2 is always full of spraying agent and the apparatus is always ready for immediate operation.

Referring to FIG. 4, the valve plug of the spraying valve 13 is conical, while the edge 26 of the valve casing which is opposite the valve cone is rectangular so that a linear seal is provided between the plug of the valve 13 and the edge 26. This ensures reliable sealing-tightness between the compressed air duct 12 and the lubricant duct 2 even when the valve 13 is open; also, air is prevented from entering the spraying agent duct 2 so that spraying agent cannot be sucked towards the nozzles 10, 11.

The spraying nozzles 10, 11 disposed at right-angles to the longitudinal axis of the casing 1 and laterally thereof are so designed that the annular flow cross-section for the spraying agent can be reduced and possibly completely closed by the outer nozzle heads being screwed further into the casing. Consequently one spraying head can be open and the other closed or both can be closed or both can be open. This feature is important where it is required to spray only one side of the mould with spraying agent or where it is required merely to distribute the spraying agent in the mould by a delivery of compressed air through one or two spraying nozzles 10 and/or 11 or if it is required to clean the mould just with compressed air.

The casing 1 shown in FIG. 1 comprises a front part 1a receiving the spraying nozzles 7, 10 and 11 and the valve 13, a central portion 1b, and a rear portion 1c which receives the trigger 15, piston valve 20 and pipe connections 35, 36. The compressed air ducts 5, 6 and the front part of the spraying agent duct 2 are formed by tubular members which are disposed inside the central part 1b and which are threadedly secured in the part 1c. The tube used for the duct 5 is formed at the forward end extending out of the bore in the part 1a with a screwthread on to which the air nozzle 7 is screwed and therefore holds the parts 1a, 1b 1c together. If it is required to use the spraying apparatus for moulds of a variety of sizes, the central part 1b and the tubes forming the ducts 2, 5 and 6 can be replaced by longer or shorter elements so that the overall length of the spraying apparatus can be varied. The invention, therefore, while using the same main elements, provides a spraying apparatus of a length which can be varied to suit requirements.

Referring to FIG. 5, a portable vessel 27 containing lubricant comprises a closure plug 28. The same is a resilient plastic plug formed with three external annular beads 29 which press against the inner walls of the exit apertures of the vessel 27. The plug 28 is therefore firmly secured and prevents any liquid from running out of the vessel 27. The centre of the plug 28 comprises a tubular extension 30 closed by the cap of the plug. A dip tube 31 made of plastic is fitted to the bottom of the extension 30 and extends as far as the base of the vessel 27, the spraying agent being supplied to the spraying apparatus through the dip tube 31.

Above the vessel 27 in FIG. 5 a connecting member 32 which may be T-shaped and its flexible mouthpiece 33 is introduced into the aperture in the extension 30 after an aperture has first been pierced in the centre of the plug 28 near the tubular extension 30 with a sharp and pointed object. Connected to the member 32 is a flexible pipe 34 which is connected to the bottom connection 35 of the casing 1. The top connection 36 thereof is connected to an air line.

When the vessel 27 has been emptied, the mouthpiece 33 is withdrawn and can be used to connect the apparatus to the next vessel. There is therefore no need to provide special supply vessels for the spraying agent, which can be used directly out of the portable vessel or can.

What we claim is:

1. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means including a stationary member arranged intermediate and connected to said supply ducts in said rear end and said supply ducts in said front end and a member disposed in said stationary member and movable relative thereto to permit in one position of operation the flow of air to said forward air duct means, and alternately to permit in another position of operation the flow of air to said air duct means and of spraying agent to said forward spraying agent duct, said unitary selective valve means extending transversely of said ducts in said rear end and in said front end, and said spraying means including a pair of nozzles disposed on opposite sides of said device and connected to said spraying agent duct.

2. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means including a stationary member arranged intermediate and connected to said supply ducts in said rear end and said supply ducts in said front end and a member disposed in said stationary member and movable relative thereto to permit in one position of operation the flow of air to said forward air duct means, and alternately to permit in another position of operation the flow of air to said air duct means and of spraying agent to said forward spraying agent duct, said spraying means including a pair of nozzles each having a circumferential annular passage connected to said spraying agent duct and a center cylindrical passage connected to said air duct means 3. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means including a stationary member arranged intermediate and connected to said supply ducts in said rear end and said supply ducts in said front end and a member disposed in said stationary member and movable relative thereto to permit in one position of operation the flow of air to said forward air duct means, and alternately to permit in another position of operation the flow of air to said air duct means and of spraying agent to said forward spraying agent duct, said spraying means including a pair of nozzles disposed on opposite sides of said device and connected to said spraying agent duct and an air nozzle threadedly connected to said forward air duct means endwise of said spraying device adapted to blow only air into the mold.

4. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means including a stationary member arranged intermediate and connected to said supply ducts in said rear end and said supply ducts in said front end and a member disposed in said stationary member and movable relative thereto to permit in one position of operation the flow of air to said forward air duct means, and alternately to permit in another position of operation the flow of air to said air duct means and of spraying agent to said forward spraying agent duct, said spraying means including a pair of nozzles each having a circumferential annular passage connected to said spraying agent duct and a center cylindrical passage connected to said air duct means, and an air nozzle threadedly connected to said forward air duct means endwise of said spraying device adapted to blow only air into the mold.

5. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means arranged intermediate said rear end and said front end operative to permit the flow of air to said forward air duct means, and alternately to permit the flow of air to said air duct means and of spraying agent to said forward spraying agent duct, said spraying means including a pair of nozzles disposed on opposite sides of said device and connected to said spraying agent duct and an air nozzle disposed endwise of said air duct means adapted to blow only air into the mold, said air duct means including a main duct and a secondary duct and said main duct being connected to said air nozzle.

6. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means arranged intermediate said rear end and said front end operative to permit the flow of air to said forward air duct means, and alternately to permit the flow of air to said air duct means and of spraying agent to said forward spraying agent duct, said spraying means including a pair of nozzles disposed on opposite sides of said device and connected to said spraying agent duct and an air nozzle disposed endwise of said air duct means adapted to blow only air into the mold, said air duct means including a main duct and a secondary duct and said main duct being connected to said air nozzle, and an agent control valve disposed in said spraying agent duct including a member responsive to air flow in said secondary duct to permit the flow of spraying agent to said pair of nozzles.

7. A spraying device in accordance with claim 6, wherein the forward end of said secondary duct communicates with lateral channels extending into said pair of nozzles.

8. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means arranged intermediate said rear end and said front end operative to permit the flow of air to said forward air duct means, and alternately to permit the flow of air to said air duct means and of spraying agent to said forward spraying agent duct, said spraying means including a pair of nozzles disposed on opposite sides of said device and connected to said spraying agent duct and an air nozzle disposed endwise of said air duct means adapted to blow only air into the mold, said air duct means including a main duct and a secondary duct and said main duct being connected to said air nozzle, said selective valve means comprising a sleeve having apertures in communication with said main duct and said secondary duct and a hollow piston movable in said sleeve having two apertures, each movable into alignment with one of said apertures in said sleeve and a third aperture movable into supply relationship with said air supply duct and a pressure lever operable to move said piston.

9. A spraying device in accordance with claim 7, wherein said piston is spring biased toward said pressure lever.

10. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means arranged intermediate said rear end and said front end operative to permit the flow of air to said forward air duct means, and alternately to permit the flow of air to said air duct means and of spraying agent to said forward spraying agent duct, said spraying means including a pair of nozzles disposed on opposite sides of said device and connected to said spraying agent duct, said device including a supply container having a closure plug having a tubular extension disposed centrally thereof connected at its free end to a dip tube and said inlet for the agent to be sprayed having a supply pipe and a union member having a pipe member received in said tubular extension and having a threaded connection with said supply pipe.

11. A compressed air spraying device for spraying air and spraying agents such as lubricants into a casting mold, said device comprising, in combination, an elongated bar-shaped casing having a rear end including an air supply duct and an inlet for air under pressure, and a spraying agent supply duct and an inlet for the agent to be sprayed, a front end including spraying means, forward air duct means connecting said spraying means to said air supply duct, a forward spraying agent duct for connecting said spraying means to said spraying agent supply duct, and unitary selective valve means arranged intermediate said rear end and said front end operative to permit the flow of air to said forward air duct means, and alternately to permit the flow of air to said air duct means and of spraying agent to said forward spraying agent duct, said spraying means including a pair of nozzles disposed on opposite sides of said device and connected to said spraying agent duct and an air nozzle disposed endwise of said air duct means adapted to blow only air into the mold, said air duct means including a main duct and a secondary duct and said main duct being connected to said air nozzle, said forward spraying agent duct, said main duct and said secondary duct defining a unit with said nozzles held in place by said air nozzle in threaded engagement with said main duct.

References Cited in the file of this patent

UNITED STATES PATENTS

| | | |
|---|---|---|
| 214,778 | King | Apr. 29, 1879 |
| 1,514,952 | Corti | Nov. 11, 1924 |
| 1,981,704 | Moore | Nov. 20, 1934 |
| 2,062,097 | Lingard | Nov. 24, 1936 |
| 2,668,083 | Kirchner | Feb. 2, 1954 |
| 2,969,923 | Fremion | Jan. 31, 1961 |
| 2,975,804 | Dunn et al. | Mar. 21, 1961 |